(12) United States Patent
Carpenter et al.

(10) Patent No.: US 6,269,428 B1
(45) Date of Patent: Jul. 31, 2001

(54) METHOD AND SYSTEM FOR AVOIDING LIVELOCKS DUE TO COLLIDING INVALIDATING TRANSACTIONS WITHIN A NON-UNIFORM MEMORY ACCESS SYSTEM

(75) Inventors: Gary Dale Carpenter, Pflugerville; Mark Edward Dean; David Brian Glasco, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/259,367

(22) Filed: Feb. 26, 1999

(51) Int. Cl.$^7$ ........................................ G06F 12/00
(52) U.S. Cl. ........................ 711/150; 710/240; 711/141
(58) Field of Search ............................ 710/200, 240; 711/119, 141, 146, 147, 148, 150

(56) References Cited

U.S. PATENT DOCUMENTS 6,078,981 * 6/2000 Hill et al. ............................ 710/200

* cited by examiner

Primary Examiner—David L. Robertson
(74) Attorney, Agent, or Firm—Casimer K. Salys; Bracewell & Patterson L.L.P.

(57) ABSTRACT

A method for avoiding livelocks due to colliding invalidating transactions within a non-uniform memory access system is disclosed. A NUMA computer system includes at least two nodes coupled to an interconnect. Each of the two nodes includes a local system memory. In response to a request by a processor of a first node to invalidate a remote copy of a cache line also stored within its cache memory at substantially the same time when a processor of a second node is also requesting to invalidate said cache line, one of the two requests is allowed to complete. The allowed request is the first request to complete without retry at the point of coherency, typically the home node. Subsequently, the other one of the two requests is permitted to complete.

10 Claims, 5 Drawing Sheets

METHOD AND SYSTEM FOR AVOIDING LIVELOCKS DUE TO COLLIDING INVALIDATING TRANSACTIONS WITHIN A NON-UNIFORM MEMORY ACCESS SYSTEM

CROSS REFERENCE TO RELATED APPLICATIONS

The present application is related to the following copending United States Patent Applications:

1. Ser. No. 09/259,366, entitled "METHOD AND SYSTEM FOR AVOIDING LIVELOCKS DUE TO COLLIDING WRITEBACKS WITHIN A NON-UNIFORM MEMORY ACCESS SYSTEM," filed on even date; and
2. Ser. No. 09/259,379, entitled "METHOD AND SYSTEM FOR AVOIDING LIVELOCKS DUE TO STALE EXCLUSIVE/MODIFIED DIRECTORY ENTRIES WITHIN A NON-UNIFORM MEMORY ACCESS SYSTEM," filed on even date.

All above-mentioned copending applications are assigned to the assignee of the present application.

BACKGROUND OF THE INVENTION

1. Technical Field

The present invention relates to a method and system for data processing in general, and in particular to a method and system for avoiding livelocks within a computer system. Still more particularly, the present invention relates to a method and system for avoiding livelocks due to colliding invalidating transactions within a non-uniform memory access computer system.

2. Description of the Prior Art

It is well-known in the computer arts that greater computer system performance can be achieved by combining the processing power of several individual processors to form a multiprocessor (MP) computer system. MP computer systems can be designed with a number of different topologies, depending on the performance requirements of a particular application. A symmetric multiprocessor (SMP) configuration, for example, is one of the simpler MP computer system topologies that are commonly used, in which resources such as a system memory are shared by multiple processors. The topology name "symmetric" stems from the fact that all processors within an SMP computer system have symmetric access to all resources within the system.

Although the SMP topology permits the use of relatively simple inter-processor communication and data sharing protocols, the SMP topology overall has a limited scalability and bandwidth, especially at the system memory level as the system scale increases. As a result, another MP computer system topology known as non-uniform memory access (NUMA) has emerged as an alternative design that addresses many of the limitations of the SMP topology, at the expense of some additional complexity.

A typical NUMA computer system includes a number of interconnected nodes. Each node includes at least one processor and a local "system" memory. The NUMA topology name stems from the fact that a processor has lower access latency with respect to data stored in the system memory at its local node than with respect to data stored in the system memory at a remote node. NUMA computer systems can be further classified as either non-cache coherent or cache coherent, depending on whether or not data coherency is maintained among caches in different nodes. The NUMA topology addresses the scalability limitations of the conventional SMP topology by implementing each node within a NUMA computer system as a smaller SMP system. Thus, the shared components within each node can be optimized for use by only a few processors, while the overall system benefits from the availability of larger scale parallelism with relatively low latency.

Despite all the various advantages, one particular concern with a NUMA system is the potential livelock problem that arises from the cache coherence protocol. For example, when a processor at a remote node is attempting to invalidate a cache line within its cache memory at the same time when a processor at a home node is also attempting to invalidate the same cache line, a livelock situation can occur. Consequently, it would be desirable to provide a method for avoiding livelocks due to colliding invalidating transactions within a NUMA computer system.

SUMMARY OF THE INVENTION

In accordance with the method and system of the present invention, a NUMA computer system includes at least two nodes coupled to an interconnect. Each of the two nodes includes a local system memory. In response to a request by a processor of a first node to invalidate a remote copy of a cache line also stored within its cache memory at substantially the same time when a processor of a second node is also requesting to invalidate said cache line, one of the two requests is allowed to complete. The allowed request is the first request to complete without retry at the point of coherency, typically the home node. Subsequently, the other one of the two requests is permitted to complete.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Numa System

A. System Overview

Figure 1:
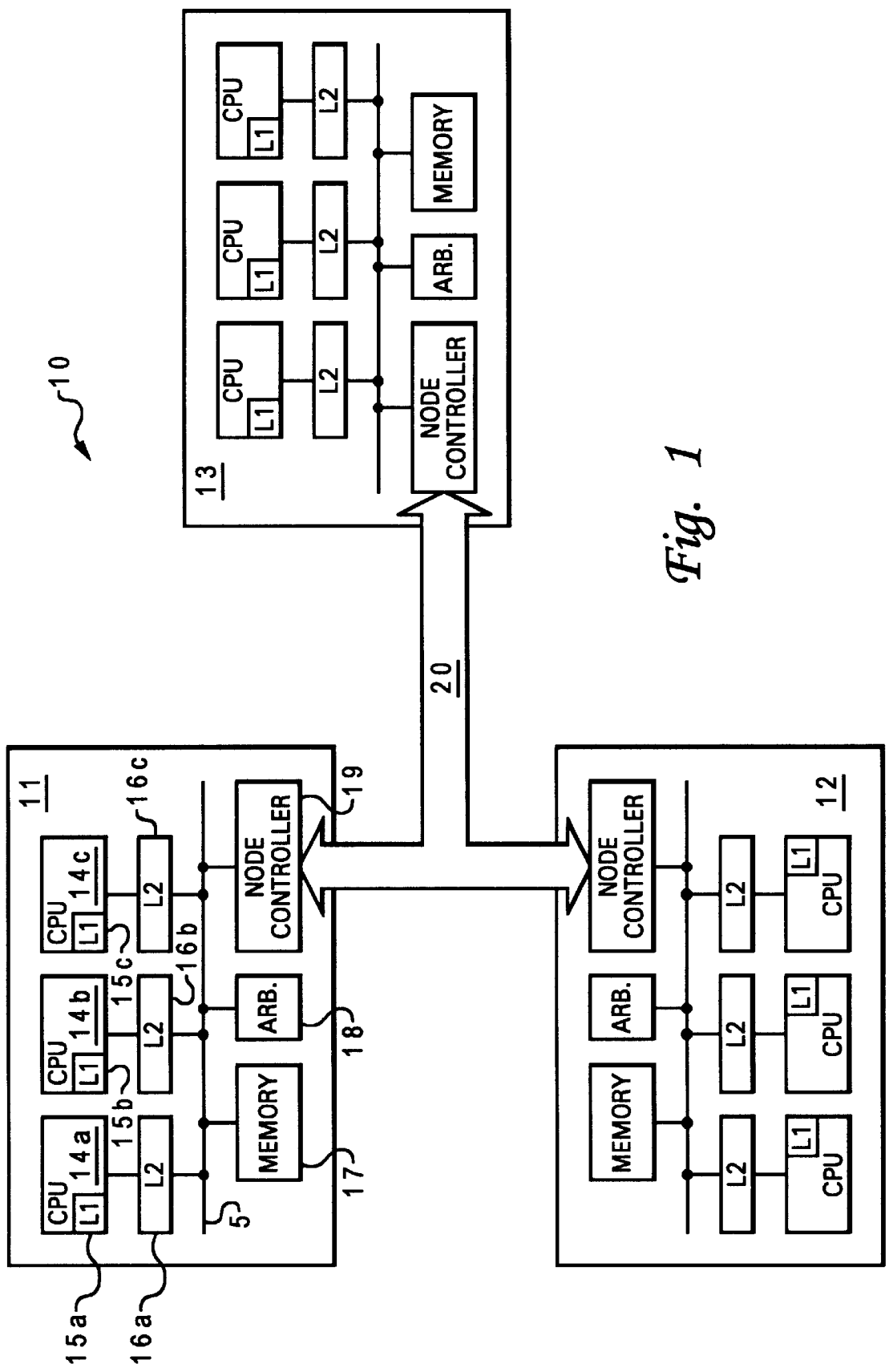
FIG. 1 is a block diagram of a non-uniform memory access (NUMA) computer system in accordance with a preferred embodiment of the present invention.

Referring now to the drawings and in particular to FIG. 1, there is illustrated a block diagram of a non-uniform memory access (NUMA) computer system in accordance with a preferred embodiment of the present invention. The depicted embodiment can be realized, for example, as a workstation, a midrange computer, or a mainframe computer. As illustrated, a NUMA computer system 10 includes processing nodes 11, 12, and 13 that are interconnected by a node interconnect 20. Each of processing nodes 11–13 includes at least one processor. For example, processing node 11 includes processors 14a–14c, all of which are preferably identical with each other.

In addition to registers, instruction flow logic and execution units utilized to execute program instructions, each of processors 14a–14c also includes a respective one of on-chip level one (L1) caches 15a–15c, which together with a respective one of level two (L2) caches 16a–16c is utilized to stage data to one of associated processors 14a–14c from a system memory 17. In other words, L1 caches 15a–15c and L2 caches 16a–16c function as intermediate storage between system memory 17 and processors 14a–14c for data that are likely to be accessed again by one of processors 14a–14c. L2 caches 16a–16c typically have a much larger storage capacity than L1 caches 15a–15c, but at a longer access latency. For example, L2 caches 16a–16c may have a storage capacity of 1–16 megabytes, while L1 caches 15a–15c may only have a storage capacity of 8–32 kilobytes. Although L2 caches 16a–16c are illustrated in FIG. 1 as external to processors 14a–14c, it should be understood that each of L2 caches 16a–16c could alternatively be incorporated within an associated one of processors 14a–14c as another level of on-chip cache memory. Furthermore, it should be understood that additional levels of cache memory (such as level 3, level 4, etc.) could be utilized to provide additional data storage. In this disclosure, each of processors 14a–14c and its associated cache hierarchy, i.e., L1 caches and L2 caches, is considered to be a single snooper.

In addition, each of processing nodes 11–13 further includes a respective node controller, such as a node controller 19 for processing node 11. Together with system memory 17 and L2 caches 16a–16c, node controller 19 is coupled to a local interconnect 5. Node controller 19 serves as a local agent for remote processing nodes 12 and 13 by performing at least the following two functions: (1) node controller 19 snoops communication transactions on local interconnect 5 and facilitates the transmission of relevant local communication transactions to the remote processing nodes 12 and (2) node controller 19 snoops communication transactions on node interconnect 20 and masters relevant communication transactions on an associated local interconnect such as local interconnect 5. Communication on each local interconnect, such as interconnect 5, is controlled by an arbiter, such as arbiter 18. Arbiter 18 regulates any access to local interconnect 5 based on bus request signals generated by any one of processors 14a–14c and compile coherency responses for snooped communication transactions on local interconnect 5. The coherence response phase of local interconnect 5 can be postponed by a ReRun coherence response. Transactions receiving a ReRun response are said to have been ReRun'd. When the device that issued the ReRun response is ready to complete the transaction, it issues a ReRun transaction, with the tag of the original ReRun'd transaction to local interconnect 5. The ReRun transaction causes the original requester to reissue the transaction at which time the coherence response phase can be completed.

Each of processing nodes 11–13 within NUMA computer system 10 may further include additional devices such as I/O devices (e.g., a display device, keyboard, or graphical pointer), non-volatile storage for storing an operating system and application software, and serial and parallel ports for connection to networks or attached devices. However, such devices are not deemed necessary for the understanding of the present invention and are accordingly omitted in order to avoid obscuring the illustration of the present invention.

B. Memory Organization

All of the processors in NUMA computer system 10, such as processors 14a–14c, share a single physical memory space, meaning that each physical address is associated with only a single system memory location. Thus, the overall contents of system memory, which can generally be accessed by any of the processors within NUMA computer system 10, can be viewed as partitioned between all the system memories. Taking the illustrative embodiment shown in FIG. 1 as an example, processor 14a addresses a 16 gigabyte address space including both a general purpose memory area and a reserved area. The general purpose memory area is preferably divided into 500 megabyte segments, with each of processing nodes 11–13 being allocated every third segment. The reserved area, which may contain approximately 2 gigabyte, includes system control and peripheral memory and I/O areas that are each allocated to a respective one of processing nodes 11–13.

For purposes of illustration, a processing node (such as processing node 11) that stores a particular datum in its system memory is said to be the home node for that datum. Conversely, the remaining processing nodes within the NUMA computer system (such as processing nodes 12 and 13) are said to be remote nodes with respect to the particular datum.

C. Memory Coherency

Because data stored within a local system memory, such as system memory 17, can be requested, accessed, modified, and cached by any one of processing node 11–13 within NUMA computer system 10, NUMA computer system 10 implements a cache coherency protocol to maintain coherency both between cache memories within the same local processing node and between cache memories within other remote processing nodes. Thus, NUMA computer system 10 can be properly classified as a cache coherent NUMA (CC-NUMA) computer system. The cache coherence protocol, most likely implementation-dependent, may comprise, for example, the well-known Modified, Exclusive, Shared, and Invalid (MESI) protocol or a variant thereof. Hereafter, it will be assumed that L1 caches 15a–15c, L2 caches 16a–16c, and arbiter 18 implement a modified MESI protocol, of which node controller 19 recognizes the Modified, Shared and Invalid states and consider the Exclusive state to be merged into the Modified state for correctness. In other words, node controller 19 assumes that data held exclusively by a remote cache is modified, regardless of whether or not the data has actually been modified.

D. Node Controller

Figure 2:
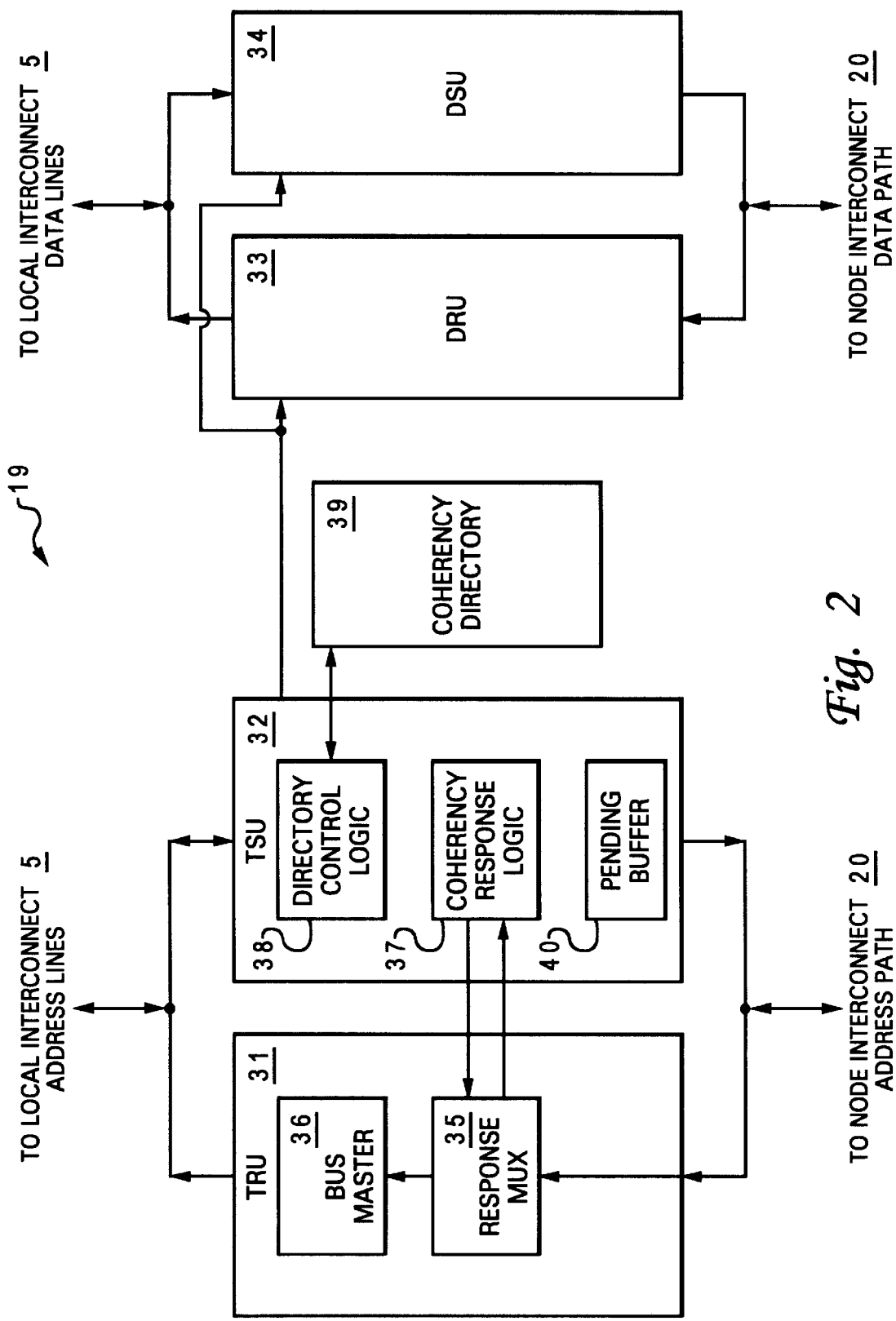
FIG. 2 is a detailed block diagram of a node controller in the NUMA computer system of FIG. 1.

With reference now to FIG. 2, there is illustrated a detailed block diagram of a node controller 19 in NUMA computer system 10 of FIG. 1. As shown, node controller 19, which is coupled between a local interconnect 5 and node interconnect 20, includes a transaction receive unit (TRU) 31, a transaction send unit (TSU) 32, a data receive unit (DRU) 33, and a data send unit (DSU) 34. As indicated, the address and data paths through node controller 19 are bifurcated, with address packets being processed by TRU 31 and TSU 32 and data packets being processed by DRU 33 and DSU 34.

TRU 31, which is so designated to indicate transaction flow off of node interconnect 20, is responsible for accepting address and coherency packets from node interconnect 20, issuing transactions on local interconnect 5, and forwarding responses to TSU 32. TRU 31 includes a response multiplexer 35, which receives packets from node interconnect 20 and passes selected packets to both bus master 36 and coherency response logic 37 within TSU 32. In response to receipt of a address packet from response multiplexer 35, bus master 36 may initiate a communication transaction on its local interconnect 5 that is the same as or different from the received address packet.

TSU 32, as indicated by its nomenclature, is a conduit for transactions flowing to node interconnect 20. TSU 32 includes a multiple-entry pending buffer 40 that temporarily stores attributes of communication transactions sourced to node interconnect 20 that have yet to be completed. The transaction attributes stored in an entry of pending buffer 40 preferably include at least the address (including tag) of the transaction, the type of the transaction, and the number of expected coherency responses from remote node who's caches may hold the line. A tag is a transaction identifier utilized to uniquely identify an active transaction in the system, and associate address transaction, and data on spit buses. Each pending buffer entry has an associated status, which can be set either to Null, indicating that once all responses are received that the pending buffer entry can be deleted, or to ReRun, indicating that TSU 32 should instruct TRU 31 to issue a ReRun request for the held tag once all responses are received. In addition to sourcing address packets on node interconnect 20, TSU 32 interacts with TRU 31 to process memory request transactions and issues commands to DRU 33 and DSU 34 to control the transfer of data between local interconnect 5 and node interconnect 20. TSU 32 also implements the modified coherency protocol (i.e., MSI protocol) for node interconnect 20 with coherency response logic 37 and maintains coherence directory 39 with directory control logic 38.

TABLE I

| Coherence directory state | Possible state(s) in local cache | Possible state(s) in remote cache | Meaning |
| --- | --- | --- | --- |
| Modified (M) | I | M, E, or I | Cache line may be modified at a remote node |
| Shared (S) | S or I | S or I | Cache line may be held non-exclusively at a remote node |
| Invalid (I) | M, E, S, or I | I | Cache line is not held by any remote node |
| Pending-shared | S or I | S or I | Cache line is in the process of being invalidated at remote nodes |
| Pending-modified | I | M, E, or I | Cache line, which may be modified at a remote node, is in the process of being written back to a system memory at the home node, possibly with invalidation at the remote node |

Coherence directory 39 stores indications of the system memory addresses of all data (e.g., cache lines) held by caches at remote nodes for which the local processing node is the home node. The address indication for each cache line is stored in association with an identifier of each remote processing node having a copy of the cache line and the coherency status of the cache line at each such remote processing node. Possible coherency states for entries in coherency directory 39 are summarized in Table I. As indicated in Table I, the knowledge of the coherency states of cache lines held by remote processing nodes is imprecise. This imprecision is due to the fact that a cache line held remotely can make a transition from S to I, from E to I, or from E to M without notifying the node controller of the home node.

E. Collision Detection

The piplined nature of the address bus and the ability to extend coherency to a remote bus via a ReRun response cause complexity in the determination of whether a transaction has completed and in the serialization of transactions that need to be serialized (or prioritized). Transactions that may interact and need to be serialized are said to "collide" with each other, and one of the transactions must be retried in accordance with collision detection rules. Generally speaking, if an agent (such as a node controller) issues a memory request that is not ReRun'd, the agent is responsible for collision detection until the memory request is completed. If a request is ReRun'd, the agent that issues the ReRun response assumes responsibility for collision detection until the transaction is reissued by the original agent in response to a ReRun transaction indicating that the delayed coherency response for the transaction can now be resolved by the system.

II. Livelock Problem

The occurrence of a livelock situation on a multiprocessor bus is a common problem that must be prevented. Livelocks can occur when two agents on the bus are trying to access the same cache line. Typically, the bus has a detection protocol for detecting collisions and rules for ensuring coherency such that colliding transaction will be retried. However, it is possible that, under certain scenarios, two colliding transactions may continue to retry each other and no progress can be made. In the prior art, there are mechanisms to avoid livelocks through random delay before a Retry'd transaction is issued again. The delay length is a function of the time for the coherence to be resolved on the bus. In a SMP single bus computer system, this delay tends to be on the order of a few ten's of cycles. In a NUMA computer system, the additional delay introduced by the interconnect crossing and the time to resolve the coherency is long enough to prevent the SMP livelock solution from being effective in these larger systems. Therefore, a better solution to a livelock problem is required for the NUMA computer system.

When a processor of a remote node attempts to invalidate a non-local copy of a cache line that is also held within its local L1 cache via a request such as a read-with-intent-to-modify (RWITM), and at the same time, a processor of a home node (or a second remote node) is also attempting to invalidate the same cache line, a livelock situation can occur.

Figure 3:
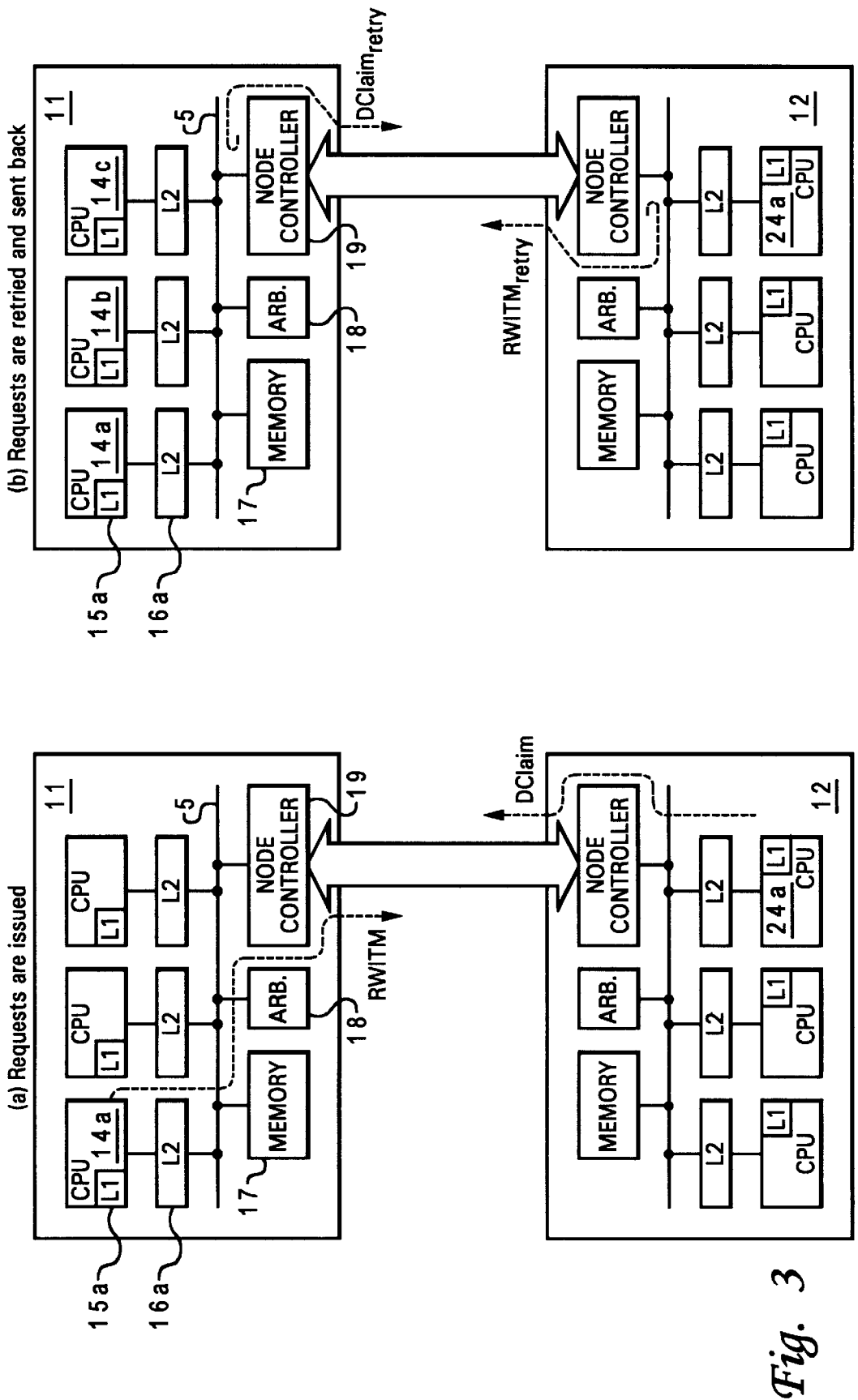
FIGS. 3a and 3b together depict an illustrative example of a livelock situation caused by invalidating transactions.

Referring now to FIGS. 3a and 3b, there is depicted an illustrative example of a livelock situation caused by colliding invalidating transactions. As shown in FIG. 3a, if a processor 14a at home node 11 attempts to invalidate a cache line held at remote node 12 via a request such as a RWITM, node controller 19 will forward the transaction to remote node 12. At the same time, a processor 24a at remote node 12 issues a request such as a DClaim request for the same cache line, as shown in FIG. 3a. When the RWITM request from node controller 19 reaches remote node 12, the RWITM request will be retried because of the outstanding DClaim request at remote node 12. Likewise, when the DClaim request from remote node 12 reaches home node 11, the DClaim request will also be retried because of the outstanding RWITM request at home node 11, as shown in FIG. 3b. Both requests will be continually retried and reissued by their respective processors, and as a result, a livelock situation can occur.

III. Solution To Livelock Problem

A preferred solution to the above-mentioned livelock situation is to let one of the invalidating requests "win." This invention uses a method of establishing a "winner" to the collision on the SMP bus at a home node. The first requesting transaction to reach the home node where a remote node may also be involved is sent to the remote node(s) with an AutoRetry mechanism to increase the probability of quickly establishing transactions as the only transaction established on that cache line at the remote nodes.

The solution increases the opportunity for the chosen invalidating request to be issued on the buses of the competing invalidations during the time the other request has been retried back to the processor, but not yet reissued. As mentioned above, the first request to establish itself at the home node (i.e., no Retry received) is chosen to win. When this invalidating request is forwarded to the required remote nodes by the node controller 19 at the home node, a special bit in the transaction called the AutoRetry bit, is set. The setting of the AutoRetry bit indicates to the transaction receive unit 31 (TRU) of node controller 19 at the remote nodes that the request should be reissued at the destination bus if it receives a Retry at that bus rather than be retried back to the sending node.

Figure 4:
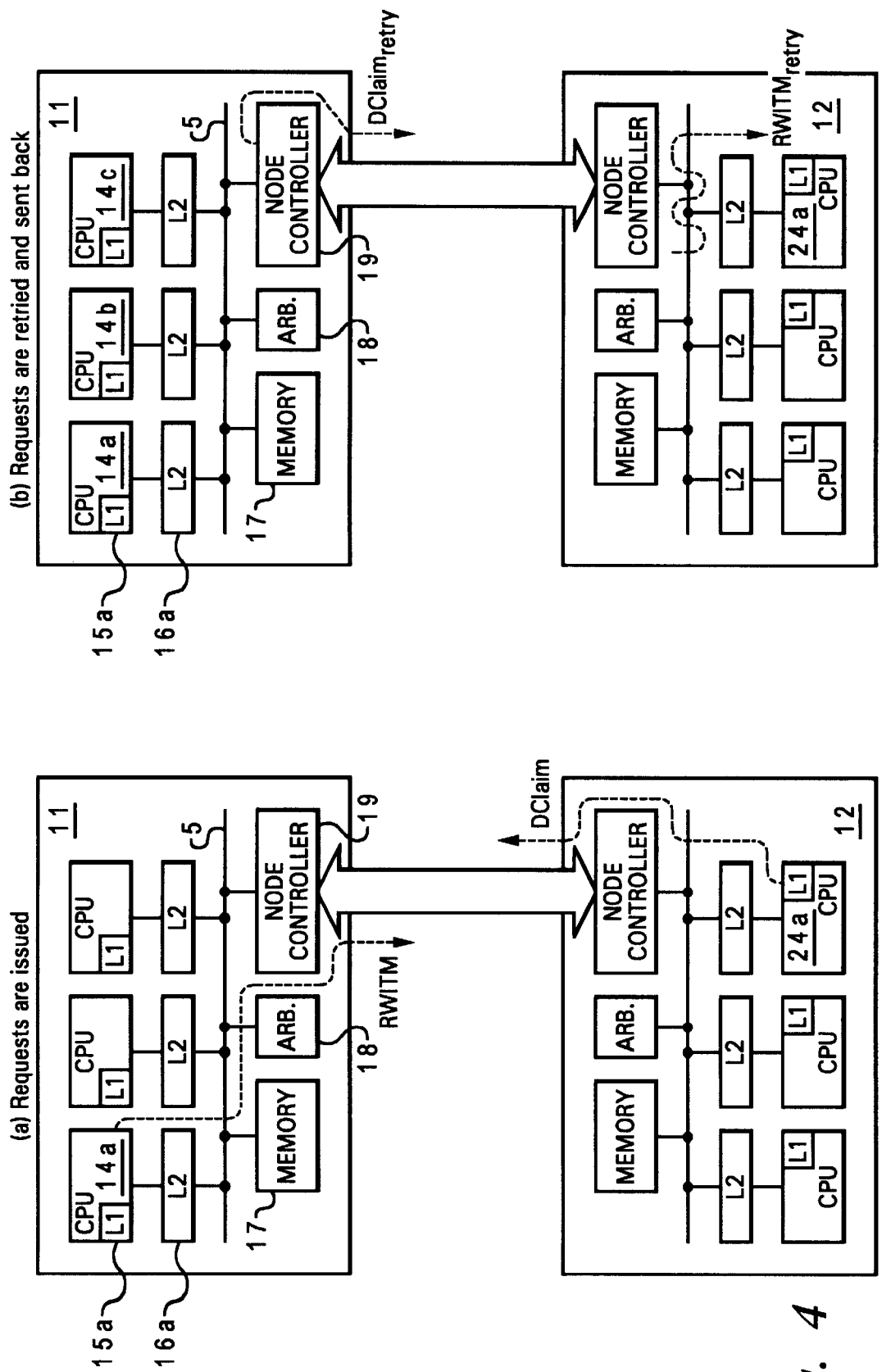
FIGS. 4a and 4b together depict an illustrative example of a solution to the livelock situation caused by invalidating transactions, in accordance with a preferred embodiment of the present invention.

In the example shown in FIGS. 4a and 4b, the RWITM request from home node 11 would be issued with the AutoRetry bit set and would be continually Retry'd locally at remote node 12, as shown in FIG. 4b. When the DClaim request from remote node 12 is retried back to processor 24a, the RWITM request from home node 11 will have an increased opportunity to complete successfully on the local bus within remote node 12. The time for the TRU of the node controller to retry a transaction is less than the average time for a processor to reissue a retried transaction. Therefore, the RWITM request from home node 11 will eventually be completed at node 12 and subsequently at node 11. Once the RWITM has completed, the DClaim can complete.

Figure 5:
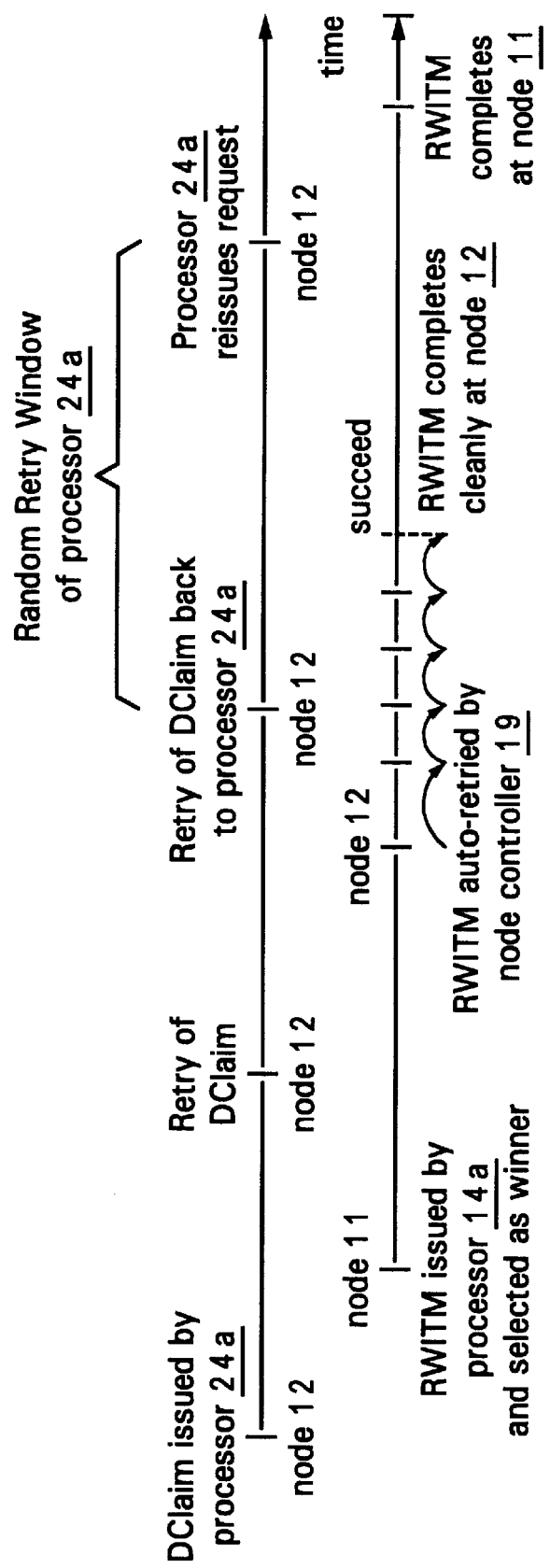
FIG. 5 is a timing example of a solution to the livelock situation caused by invalidating transactions, in accordance with a preferred embodiment of the present invention.

Referring now to FIG. 5, there is depicted a timing example of a solution to the livelock situation caused by colliding invalidating transactions, in accordance with a preferred embodiment of the present invention. As shown, the RWITM request (i.e., the "winner") succeeds sometime during the Random Retry Window of processor 24a.

As has been described, the present invention provides a method for avoiding livelocks due to colliding invalidating transaction within a NUMA computer system.

While the invention has been particularly shown and described with reference to a preferred embodiment, it will be understood by those skilled in the art that various changes in form and detail may be made therein without departing from the spirit and scope of the invention.

What is claimed is:

1. A method for avoiding livelocks due to a colliding invalidating transactions within a non-uniform memory access (NUMA) computer system, said method comprising the steps of:

in response to a request by a processor of a first node within said NUMA computer system to invalidate a modified cache line at a second node within said NUMA computer system substantially simultaneously with a request by a processor of said second node to invalidate said modified cache line, wherein each of said two nodes includes a separate local bus, allowing said request by said processor of said first node to complete if said first node is considered as an owning node of said modified cache line; and thereafter, permitting said request by said processor of said second node to complete.

2. The method of claim 1, wherein said requests are any invalidating request.

3. The method of claim 1, wherein one of said requests is a read-with-intent-to-modify request.

4. The method of claim 1, wherein said allowing step further includes a step of setting an AutoRetry bit for said request by said processor of said first node such that said request by said processor of said first node is reissued at said second node instead of retried at said first node.

5. The method of claim 1, wherein said first node is a home node and said second node is a remote node.

6. A non-uniform memory access (NUMA) computer system capable of avoiding livelocks due to a colliding invalidating transactions, comprising:

in response to a request by a processor of a first node within said NUMA computer system to invalidate a modified cache line at a second node within said NUMA computer system substantially simultaneously with a request by a processor of said second node to invalidate said modified cache line, wherein each of said two nodes includes a separate local bus, means for allowing said request by said processor of said first node to complete if said first node is considered as an owning node of said modified cache line; and means for permitting said request by said processor of said second node to complete.

7. The NUMA computer system of claim 6, wherein said requests are any invalidating request.

8. The NUMA computer system of claim 6, wherein one of said requests is a read-with-intent-to-modify request.

9. The NUMA computer system of claim 6, wherein means for allowing further includes a means for setting an AutoRetry bit for said request by said processor of said first node such that said request by said processor of said first node is reissued at said second node instead of retried at said first node.

10. The NUMA computer system of claim 6, wherein said first node is a home node and said second node is a remote node.

* * * * *